Sept. 2, 1952     E. M. McELHINNEY ET AL     2,609,216
SHARP TURN STEERING APPARATUS FOR VEHICLES Filed June 6, 1947     3 Sheets-Sheet 1

Inventor
E. M. McElhinney
J. K. Podhajsky
By Rudolph L. Lowell
Attorney

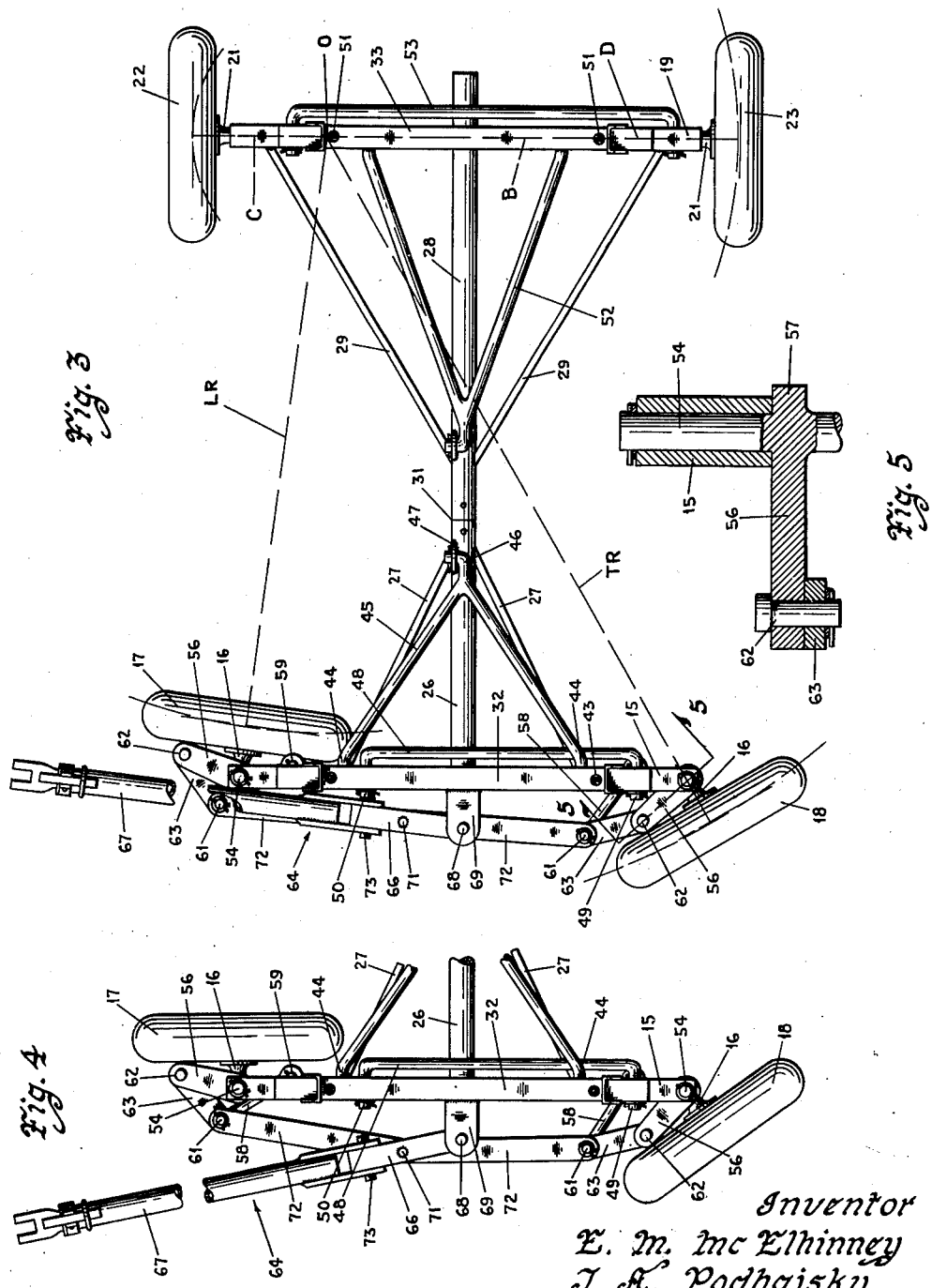

Sept. 2, 1952     E. M. McELHINNEY ET AL     2,609,216
SHARP TURN STEERING APPARATUS FOR VEHICLES
Filed June 6, 1947     3 Sheets-Sheet 3
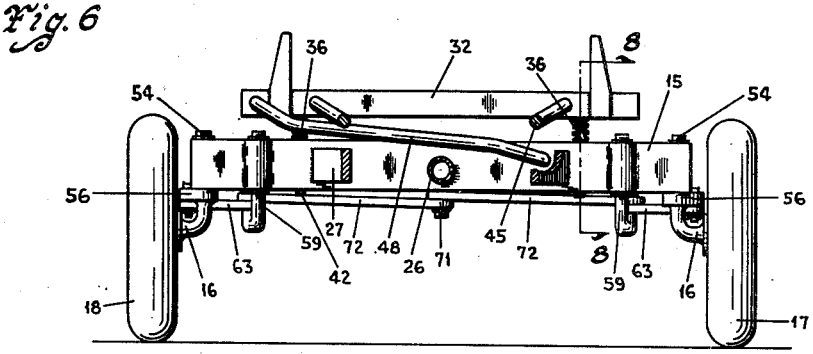
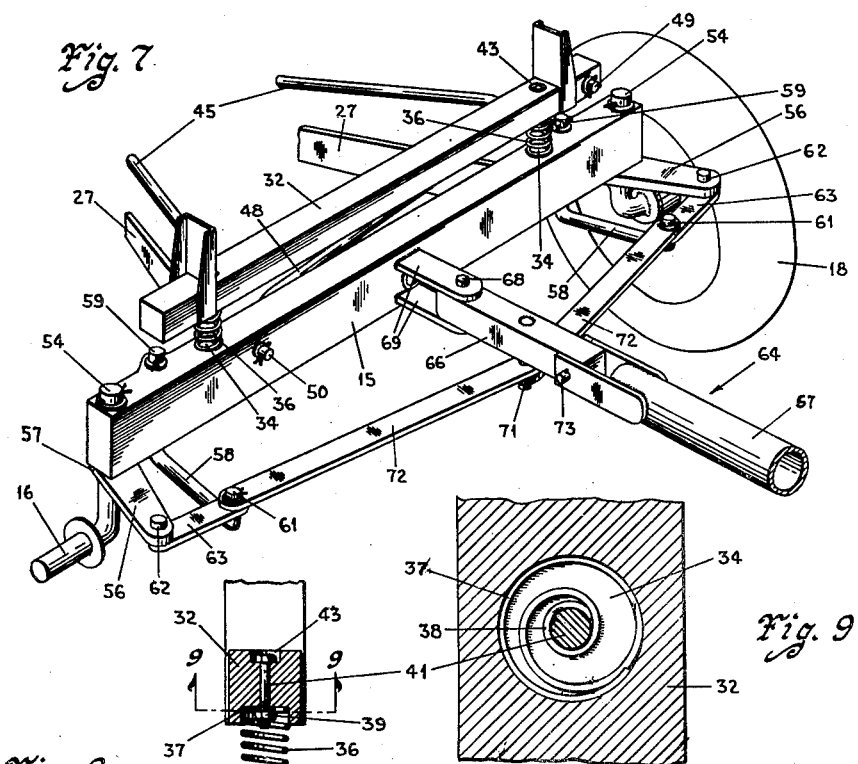
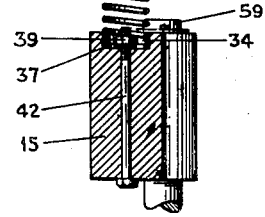
Inventor
E. M. McElhinney
J. K. Podhajsky
By Rudolph L. Lowell
Attorney Patented Sept. 2, 1952

2,609,216

UNITED STATES PATENT OFFICE 2,609,216

SHARP TURN STEERING APPARATUS FOR VEHICLES

Eric M. McElhinney, Dysart, and Theodore A. Podhajsky, Traer, Iowa

Application June 6, 1947, Serial No. 752,926

5 Claims. (Cl. 280—103)

1

This invention relates to mechanism for connecting and manipulating the steering wheels of a vehicle in which the wheels are mounted on separate spindles, and which mechanism is so constructed that the wheels may be turned or angled on their respective spindles to a greater extent and by comparatively lesser movement of the steering element than is found in other devices that have come to our attention. While the device is applicable to various types of implements and vehicles it is particularly efficient and useful in connection with farm wagons and is here only shown in that connection.

In the use of a farm wagon for picking corn it is desirable that the wagon have a short turning radius to accomplish a sharp turn at the ends of the corn rows, corresponding to the turning movement of the tractor unit. Where a large turning radius is required, the row ends cannot be machine picked and are either left unpicked or are manually picked. Either situation is objectionable.

Sharp turn wagons of four-wheel type now in common use are generally incapable of making a short turn commensurate with the turning radius of a usual tricycle type tractor. This is due either to the fact that the wagon steering apparatus does not provide for a substantially one hundred and eighty degree turning movement of the front wheels, or to the fact that when such turning movement is provided the wagon tongue, in a full turn position therefor, is in a forwardly inclined position relative to the wagon front axle. As a result the front wheels, during a turning movement, are often times skidded along the ground and the wagon tongue is either bent, when made of metal, or broken when made of wood.

It is an object of this invention, therefore, to provide an improved steering apparatus for a farm wagon.

Another object of this invention is to provide a wagon capable of making sharp turns and having stability against tipping in all turned positions therefor.

A further object of this invention is to provide a wagon steering apparatus of a construction such that the wagon easily trails or follows the turning movements of a tricycle type tractor.

Yet another object of this invention is to provide a wagon steering apparatus in which the turning movement of the wagon tongue and the wagon front wheels are maintained in a predetermined relation so as to substantially eliminate any skidding of the front wheels or injury to the wagon tongue.

2

A particular feature of this invention is found in the provision of a steering apparatus for a farm wagon having pivoted front wheel spindles, in which levers pivoted on the front axle and arms mounted for pivotal movement with the spindles, are connected through a link system with a pivoted wagon tongue such that, in a full turn position, the tongue and the front wheel, which leads in the direction of a turn, are in positions substantially parallel with the front axle.

Another feature of this invention is found in the provision of a steering apparatus for a wagon in which a pivoted tongue, connected through a link and lever system with pivoted front wheel spindles, is movable to a full turn position substantially parallel with the wagon front axle, in a lagging relation with the front wheel leading in the direction of the turn, so that such leading wheel is positioned substantially parallel to the front axle prior to the movement of the tongue to its full turn position.

Further objects, features and advantages of this invention will become apparent from the following description when taken in connection with the accompanying drawings, in which:

Fig. 3 is a plan view of the wagon in Fig. 1 with the steering apparatus shown in a full turn position therefor;

Fig. 4 is a plan view of the front end of the wagon showing the steering apparatus in a changed position relative to its showing in Fig. 3;

Fig. 5 is an enlarged sectional detail view taken on the line 5—5 in Fig. 3;

Fig. 6 is a sectional detail view as seen on the line 6—6 in Fig. 1;

Fig. 7 is a perspective view of the steering apparatus of this invention;

Fig. 8 is an enlarged sectional detail view as seen along the line 8—8 in Fig. 6; and Fig. 9 is an enlarged sectional detail view taken along the line 9—9 in Fig. 8.

Figures 1, 2:
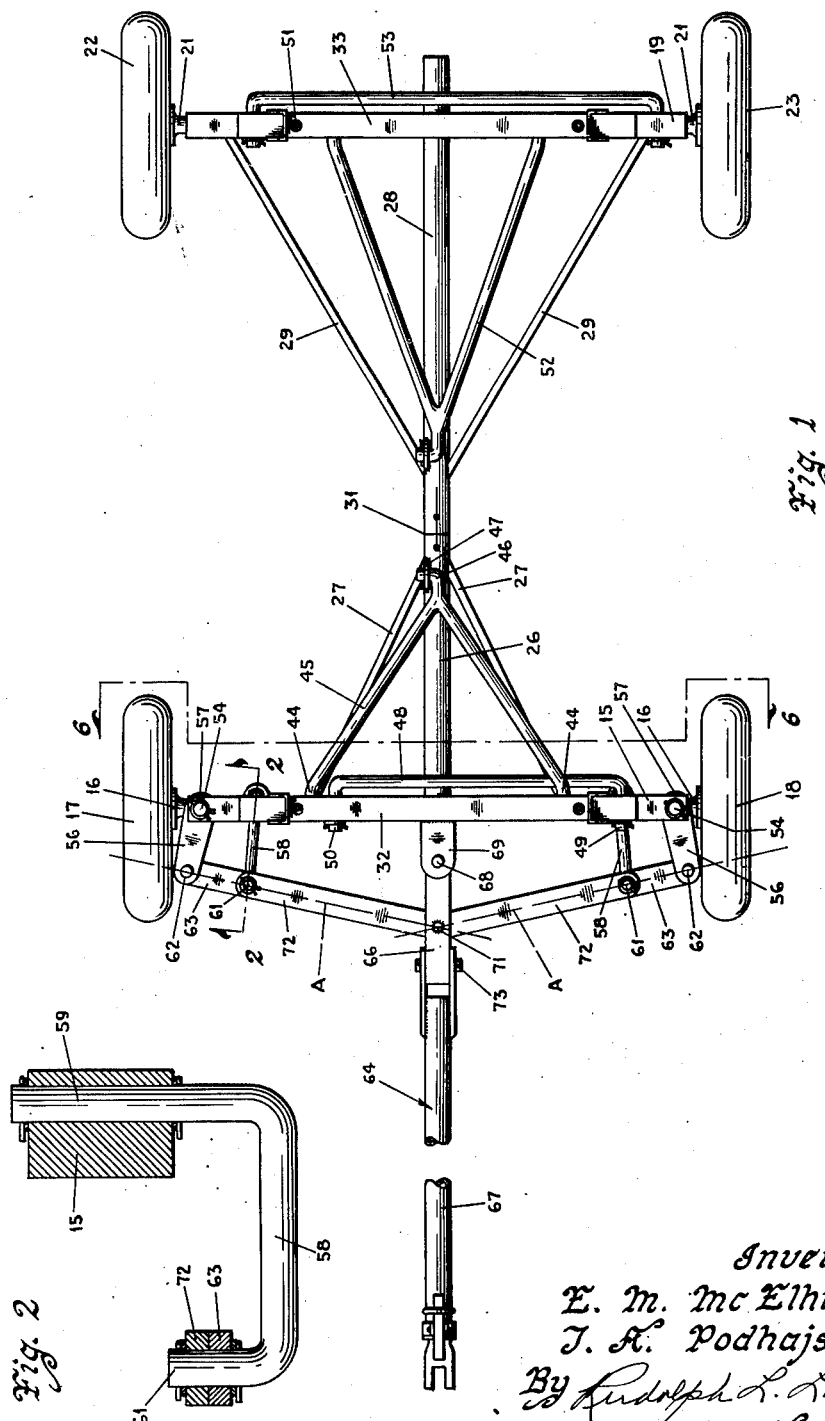
Fig. 1 is a plan view of a farm wagon embodying the steering apparatus of this invention, with steering apparatus being shown in a straight pull position therefor.
Fig. 2 is an enlarged sectional detail view as seen on the line 2—2 in Fig. 1.

With reference to the drawings, the steering apparatus of this invention is illustrated in Figs. 1 and 3 in assembly relation with a wagon which includes a front axle 15 having pivoted front wheel spindles 16 equipped with front wheels 17 and 18. A rear axle 19 is provided with fixed spindles 21 for rotatably carrying rear wheels 22 and 23.

Extended rearwardly from the front axle 15 is a tubular reach section 26 having front axle braces 27. In turn the rear axle 19 carries a forwardly projected tubular reach section 28, which is supported in part by rear axle braces 29. The two reach sections 26 and 28 have their adjacent ends suitably connected at 31 for relative rotational movement therebetween, whereby the front wheels 17 and 18, and the rear wheels 22 and 23, are relatively movable in up and down directions to provide for a smooth travel of the wagon over uneven ground surfaces.

The front bolster 32 and the rear bolster 33 are spring supported in a like manner on their respective axles, so only the spring support of the front bolster on its axle will be described in detail. As best appears in Figs. 6, 7 and 8, the upper side of the front axle 15 is formed with a pair of longitudinally spaced cavities 34 which constitute cups for receiving the lower ends of a pair of coil springs 36. The end coils 37 (Fig. 9) of the springs 36 are inwardly spiralled in a common plane such that their innermost spirals 38 are adapted to engage nuts 39 for spring holding bolts 41 and 42, extended through the bolster and axle, respectively, and through the spirals 38. The top side of the front bolster is countersunk at 43 so that the heads of the bolts 41 are within the confines of the bolster. It is seen, therefore, that the front bolster 32 is floatingly supported on the springs 36 for up and down movement relative to the front axle 15.

The front bolster 32 is maintained against movement transversely of the front axle 15 by means including a wishbone member 45 (Figs. 1 and 3) having its double ends 44 connected adjacent the opposite ends of the front bolster 32 and its single end formed with a hook 46. The hook 46 is inserted through an upright support 47 carried at the rear end of the front reach section 26, to provide for an up and down pivotal movement of the wishbone member 45.

In order to hold the front bolster 32 against movement longitudinally of the front axle 15, there is provided a sway rod 48 of an irregular shape, having its opposite ends 50 and 49 bent in the same direction and pivotally supported adjacent opposite ends of the axle 15 and bolster 32, respectively.

For the rear bolster 33 top holding bolts for the coil springs 36 are indicated at 51 (Figs. 1 and 3), a wishbone member at 52 and a sway rod at 53.

In the steering apparatus of this invention the front wheel spindles 16 (Figs. 5, 6 and 7) are integrally formed with upright pivots 54 which are carried at opposite ends of the front axle 15. Rock arms or steering arms 56 are mounted on, or integrally formed with, the upright spindle pivots 54 so as to be pivotally movable with the spindles. The arms 56 are arranged to the underside of the front axle 15 and are enlarged at their fixed ends 57 to constitute supports for the front axle 15.

A pair of levers 58 (Figs. 2, 6 and 7), of a generally U-shape, have legs 59 at their rear ends which are pivotally extended through the front axle 15 at positions spaced inwardly and rearwardly relative to the spindle pivots 54. The levers 58 are of a length such that their front legs 61 are positioned ahead of the free ends 62 of the arms 56, when the arms and levers are projected forwardly from the front axle 15. Short links 63 are pivotally connected between the front legs 61 of the levers 58 and the free ends 62 of the arms 56.

A draft member or tongue, indicated generally as 64, is comprised of a rear section 66 and a front section 67. The rear tongue section 66 has its rear end pivotally supported at 68 for pivotal movement transversely of the wagon, between a pair of vertically spaced supports 69 (Fig. 7) which are projected forwardly from the front side of the axle 15. Arranged on the rear section 66, at a position forwardly of the pivot 68, is a downwardly extended pivot member 71. Steering linkage including long links 72 are pivotally connected between the pivot 71 and the front legs 61 of the levers 58.

The front tongue section 67 is pivotally connected at 73, with the front end of the rear section 66, for up and down pivotal movement. It is contemplated that the front tongue section 67 be of an extensible construction to facilitate the connection of the wagon with a tractor unit. Thus it is seen that the rear section 66 constitutes a lever member extended between the pivots 68 and 71, and that the front section 67 constitutes a steering member for manipulating the lever or rear tongue section 66 to actuate the steering apparatus.

In the operation of the steering apparatus, assume the tongue 64 to be in its straight pull position illustrated in Fig. 1. For this position of the tongue 64 the levers 58 and arms 56 are in positions extended forwardly and outwardly from the front axle 15, with the outward angular inclination of the arms 56 being somewhat greater than that of the levers 58. Further, it is seen that the pivots 61, 62 and 71 for each adjacent pair of links 63 and 72 are located in a substantially straight line, as indicated at A, which lines A are inclined rearwardly from the common pivot 71 on the tongue rear section 66. As a result the pivots 62, 61 and 71, in that order, are arranged progressively forwardly from the front axle 15, with the tongue pivot 68 being located rearwardly of the pivots 62.

It is seen, therefore, that each pair of adjacent links 63 and 72 are in longitudinal alignment when the tongue 64 is in a straight pull position. Any turning movement of the tongue 64 is thus immediately transmitted to the arms 56 to turn or angle the wheels 17 and 18.

The tongue 64 is movable to a full turn position against the axle 15, as illustrated for a right hand turn in Fig. 3, in which it is arranged forwardly of and in a substantially parallel relation with the axle 15.

This full turn or substantially ninety degree swing of the tongue effects a movement of the front wheel 17, which leads in the direction of the turn, to a position in a plane inclined rearwardly and outwardly from the rear side of the axle 15. Concurrently with the movement of the leading wheel 17 to this position, the trailing wheel 18 is movable to a position in a plane inclined forwardly and inwardly relative to the front side of the axle 15. For a full turn position to the right, therefore, the leading wheel 17 is moved through an angular turning distance which is greater than the angular turning distance for the trailing wheel 18.

In their relative positions for a right hand turn, the leading wheel 17 travels on the ground in a circle defined by the radius indicated as LR, and the trailing wheel 18 travels in a circle defined by the radius TR, with the radii LR and TR intersecting at a point O on the axis D for the rear axle 19, at a position spaced inwardly from the rear wheel 22. The rear wheel 22 thus moves in a circle having a radius C and the rear wheel 23 moves in a circle with a radius B. It is apparent, of course, that the intersection point O of the radii LR and TR for different length wagons, may occur at one side or the other of the rear axle 19, but always at a point between the spindle pivots 54.

It will be appreciated that a wagon or other vehicle equipped with only steerable front wheels will have its shortest turning radius when both the leading and trailing front wheels move in circles having equal radii which intersect on the longitudinal axis of the wagon. The closer this desideratum is approached, therefore, the shorter is the turning radius for the wagon. In other words, the turning radius of the wagon is limited by the turning movement of the wheel which has the largest circle or arc of travel. As seen in Fig. 3, the trailing wheel 18 moves through the largest arc of travel and thus defines the turning radius of the wagon. By having the intersection point O approaching the longitudinal axis of the wagon, this turning radius is appreciably shortened relative to short turn wagons now in common use.

When the tongue 64 is in a full turn position (Fig. 3), the long links 72 are in substantial longitudinal alignment in positions substantially parallel with the tongue, and the arm 56 and lever 58, corresponding to the trailing wheel 18, are in a substantially parallel relation. As a result, any further turning movement of the tongue 64 would move the links 72 toward the trailing wheel 18 whereby the wheels 17 and 18 would be moved out of the direction of the turn. Any locking of the leading wheel 17 with the rear side of the front axle 15 is thus eliminated.

When attempting to accomplish a sharp turn, in other devices that have come to our attention, a bending or breaking of the wagon tongue, and a skidding of the front wheels generally occurs because of the fact that the tongue is not movable to a full turn position substantially parallel with the front axle and reaches a full turn position therefor when the leading wheel is substantially parallel with the front axle. Stated otherwise, the leading wheel is in a full turn position when the tongue is in a forwardly and outwardly inclined position relative to the front axle. A continued turning pull on the tongue, tending to move the tongue parallel with the front axle, thus acts to bend the tongue about its pivotal support and applies a rearward push on the wagon.

In the present invention, and as illustrated in Fig. 4, the leading wheel 17 is in a plane substantially parallel to the front axle 15 when the tongue is in a moved position inclined forwardly and outwardly from the axle 15 in the direction of the turn. A relatively sharp turn of the wagon is thus effected before the tongue 64 reaches its full turn position. On a continued movement of the tongue 64 to the full turn position therefor, shown in Fig. 3, the leading wheel 17 is inclined rearwardly and outwardly relative to the axle 15 to further decrease the turning radius. As a result of this leading movement of the wheel 17 relative to the tongue 64, a sharp turn is quickly and easily made with substantial elimination of any bending action on the tongue or skidding of the front wheels. A sharp turn is further facilitated by virtue of the relative construction and arrangement of the arms 56, levers 58 and links 63 and 72 to provide for a faster rate of movement of the leading wheel 17, relative to the trailing wheel 18, through a greater turning movement.

It will be understood, of course, that the operation of the steering apparatus for a left hand turn is the same as that described above for a right hand turn.

In one embodiment of the invention the center to center distance between the spindle pivots 54 is about five feet and one inch; the center distance between a spindle pivot 54 and a lever pivot 59 about seven inches; the distance between a center line through the spindle pivots 54 and the tongue pivot 68 about six and one-quarter inches; and the center distance between the pivots 68 and 71 about seven and three-quarter inches. The length of the levers 58, between their pivots 59 and 61 is about eleven inches, and the length of the arms 56 between the spindle pivots 54 and the pivots for the short links 63 is about seven and one-half inches. In this embodiment the short links and long links 63 and 72 between their pivots are eight and one-quarter inches long and two feet one and one-quarter inches long, respectively.

When the tongue 64 is in a straight pull position therefor the levers 58 are inclined outwardly from the longitudinal axis of the front axle 15 at angles of eighty-six degrees, and the arms 56 at angles of seventy-seven degrees.

From a consideration of the above description, it is seen that the invention provides a steering apparatus for a wagon which is of a simple and compact construction, and capable of providing a short turning radius for the wagon without bending or breaking the wagon tongue, or skidding the wagon front wheels. The front wheels are immediately movable in response to a turning movement of the wagon tongue, from a straight pull position therefor, and the leading wheel, in the direction of a turn, is moved in a predetermined relation relative to the movement of the tongue, such that it is in a plane substantially parallel with the front axle prior to the movement of the tongue to its full turn position.

Although the invention has been described with respect to a preferred embodiment thereof, it is to be understood that it is not to be so limited since changes and modifications can be made therein which are within the full intended scope of this invention, as defined by the appended claims.

We claim:

1. A steering apparatus for a vehicle comprising a front axle provided with a pair of spindle pivots, each of said pivots having a front wheel spindle integral therewith, arm members rigidly connected to said spindle pivots for pivotal movement therewith, a draft member, means on said axle pivotally supporting said draft member at a spaced position forwardly of said axle, a single pivot on said draft member at a position forwardly of the pivotal supporting means therefor, a pair of forwardly extended levers pivoted adjacent opposite ends of said axle, first links pivotally connected to the free ends of said arms and levers, and second links pivotally connected to the free ends of said levers and said single pivot, with the pivotal supporting means for said draft member being located rearwardly of the pivotal connections of the first and second links with the levers.

2. A steering apparatus for a vehicle comprising a front axle provided with a pair of spindle pivots, each of said pivots having a front wheel spindle extending rigidly therefrom, arms mounted on said spindle pivots for pivotal movement therewith, a pair of levers each of which has its rear end pivotally supported on said axle at a position spaced inwardly and rearwardly relative to a corresponding spindle pivot, a draft member pivoted adjacent its rear end on said axle, a pivot means on said draft member located forwardly from its rear end, first links pivotally connected to the free ends of said arms and said levers, and second links pivotally connected to the free ends of said levers and said pivot means, said pivot means, when the draft member is in a straight pull position, being in a position forwardly of the link connections with said levers, said last mentioned connections in a position forwardly of the connections of said arms with said first links, and the rear end pivot for the draft member in a position rearwardly of the first link connections with said arms, with said arms and levers being relatively constructed and arranged such that said draft member is movable in either direction from a straight pull position therefor to a position substantially parallel with said front axle to provide for a concurrent movement of the front wheel, leading in the direction of the turn, to a position at the rear side of the axle and in a plane substantially parallel to the axle.

3. A steering apparatus for a vehicle comprising a front axle with spindle pivots on opposite end portions thereof, wheel spindles extending from said pivots, forwardly extended arm members carried on said spindle pivots for pivotal movement therewith, a pair of corresponding lever members each pivotally supported at its rear end on said axle at a position spaced inwardly from a corresponding spindle, a third lever member pivoted at its rear end on said axle at a position intermediate said pair of lever members, a first pair of link members each pivotally connected to an arm member and to the lever member corresponding thereto, a second pair of link members each pivotally connected to one of said lever members and having a common pivotal connection with said third lever member, with the pivot for the rear end of said third member being located rearwardly of the front ends of said arm members, and a steering member operatively connected with one of said lever members.

4. A steering apparatus for a vehicle comprising a front axle with spindle pivots at its opposite ends, a front wheel spindle extending rigidly from each of said pivots, arms carried on said spindle pivots for pivotal movement therewith, a pair of levers pivotally supported at their ends on said axle inwardly from the pivots for the respective spindles, with said levers being arcuately swingable in a horizontal plane and having their free ends located forwardly of the free ends of said arms, a draft member pivoted at its rear end on said axle, a pivot member on said draft member, a first pair of links each of which is pivotally connected to the free ends of a corresponding arm and lever, and a second pair of links each of which is pivotally connected to the free end of a corresponding lever and to said pivot member at a position forwardly of said levers, with each corresponding pair of first and second links forming complementary angles of substantially 180° with a corresponding lever, when the draft member is in a straight pull position therefor, so that when the draft member is in a moved position generally parallel with said front axle, said second pair of links are in substantially longitudinally aligned positions parallel with said draft member.

5. A vehicle forecarriage comprising an axle, ground wheel spindles journaled vertically in the ends of said axle and having laterally extending actuating arms, a steering member pivoted to the axle centrally between the arms and connected to the arms by respective pairs of links, the links of each pair being joined by pivot connections, levers corresponding to said pairs of links connecting said pivot connections rearwardly to the axle, with said levers being arcuately swingable in a horizontal plane, and a pivot connection on said steering member for pivotally connecting together the inner ends of said pairs of links, with the pivot connection joining each pair of links being spaced farther from the axle than the outer ends of said pair of links, the pivot connection for the inner ends of said pairs of links being spaced farther from the axle than the corresponding pivot connection joining each pair of links, and with each pair of links forming complementary angles of substantially 180° with a corresponding lever, when said wheel spindles are in longitudinal alignment with said axle.

ERIC M. McELHINNEY.
THEODORE A. PODHAJSKY.

REFERENCES CITED

The following references are of record in the file of this patent:

UNITED STATES PATENTS

| Number | Name | Date |
| --- | --- | --- |
| 1,846,651 | Orelind | Feb. 23, 1932 |
| 2,095,566 | Lundelius et al. | Oct. 12, 1937 |
| 2,122,924 | Ammen et al. | July 5, 1938 |

FOREIGN PATENTS

| Number | Country | Date |
| --- | --- | --- |
| 55,400 | Denmark | Oct. 31, 1938 |
| 64,380 | Denmark | Mar. 18, 1946 |